US006299818B1

(12) United States Patent
Hawkinson

(10) Patent No.: US 6,299,818 B1
(45) Date of Patent: Oct. 9, 2001

(54) PROCESS AND APPARATUS FOR MOLDING JEWELRY

(75) Inventor: Todd R. Hawkinson, St. Paul, MN (US)

(73) Assignee: T. R. Hawkinson Ltd., Saint Paul, MN (US)

( * ) Notice: Subject to any disclaimer, the term of this patent is extended or adjusted under 35 U.S.C. 154(b) by 0 days.

(21) Appl. No.: 09/691,996

(22) Filed: Oct. 19, 2000

Related U.S. Application Data

(63) Continuation-in-part of application No. 09/213,037, filed on Dec. 16, 1998, now Pat. No. 6,171,093.

(51) Int. Cl.$^7$ ............................ B29C 33/00; B29C 33/06; B29C 35/08; B29C 39/10
(52) U.S. Cl. ........................... 264/478; 264/299; 264/496; 264/DIG. 55; 264/271.1; 425/174.4; 425/175; 425/DIG. 44; 249/139; 249/160
(58) Field of Search ................................. 264/478, 219, 264/328.1, 299, DIG. 55, 494, 496, 271.1; 425/174.4, 175; 249/104, 112, 117, 139, 160

(56) References Cited

U.S. PATENT DOCUMENTS

| | | | | |
|---|---|---|---|---|
| 1,997,500 | * | 4/1935 | Swarovski | 264/DIG. 55 |
| 2,448,640 | * | 9/1948 | Weston | 425/DIG. 44 |
| 2,658,237 | * | 11/1953 | Cuppett et al. | 425/DIG. 44 |
| 3,813,201 | * | 5/1974 | Frederick et al. | 249/141 |
| 4,946,637 | * | 8/1990 | Masciarelli, Jr. | 264/226 |
| 5,066,213 | * | 11/1991 | Ferincz | 425/175 |
| 5,798,129 | * | 8/1998 | Megleo | 425/215 |
| 6,171,093 | * | 1/2001 | Hawkinson | 264/DIG. 55 |

* cited by examiner

Primary Examiner—Angela Ortiz
(74) Attorney, Agent, or Firm—Nikolai & Mersereau, P.A.

(57) ABSTRACT

A new technique for efficiently manufacturing jewelry includes the use of a universal frame in combination with a low cost flexible mold. Various inserts can also be used to customize jewelry pieces made using the mold and frame. The material cured in the mold can be cured with ultraviolet light, which penetrates the mold, the mold frame and an arbor, which transmit ultraviolet light to better cure the item being molded.

8 Claims, 4 Drawing Sheets

PROCESS AND APPARATUS FOR MOLDING JEWELRY

This patent application is a continuation-in-part of application Ser. No. 09/213,037 filed Dec. 16, 1998, now U.S. Pat. No. 6,171,093.

BACKGROUND OF THE INVENTION

I. Field of the Invention

The present invention relates to improved and less costly techniques for molding jewelry during mass production. More specifically, the present invention relates to the manufacture and use of low cost silicone molding compounds within a hard aluminum injection mold frame. Use of such apparatus streamlines the molding and injecting of multiple jewelry patterns as compared to the lost wax method of casting jewelry components. The mold allows transmission of ultraviolet light to cure the item molded.

II. Description of the Prior Art

Today there exists a variety of techniques for manufacturing jewelry such as rings, pendants or the like. The lost wax manufacturing process starts with an original model. The model is typical of a one-of-a-kind item made from a variety of materials. This model has a mold made around it and is removed from the mold to create a hollow cavity. An air, hydraulic wax or plastic injector is then utilized to force wax or plastic into the mold cavity. Multiple injected wax patterns from this mold allow many of the same item to be reproduced. Each model requires its own mold for production.

The construction of molds used in the lost wax or other manufacturing processes is time-consuming and expensive. Several molding materials are utilized for a variety of manufacturing processes. Silicone rubber, gum rubber and a lead-type metal are industry standards for mold-making materials. Each model requires an individual mold for production. As the designs grow more detailed, the tooling required to make the mold becomes more intricate and the cost of the mold increases. A single mold may cost several hundred dollars and can be made in many multiple pieces.

Over time and as a result of use, these molds do wear out. Lead-type molds oxidize. Because the molds wear out, all master models must be retained so that replacement molds can periodically be created. Making molds of metal have other serious draw backs. For example, such molds are very rigid and typically are made to split in two along a single rigid parting line. This limits the sophistication, intricacy and dimension of the design that can be created. It also limits the nature of true dimensional design (models with severe undercuts, for example). In addition, metal molds have a shrinkage factor when used as a molding material. This creates the need for an additional factor to be incorporated into the model-making process to compensate for wax pattern consistency. Fitting stones into the model and taking the model through the mold-making process makes additional tolerances for stone sizing necessary. The molds did not allow for ultraviolet light to be used in an aid to curing the item being molded. Finally, metal molds made of a lead-type material pose significant health concerns.

SUMMARY OF THE INVENTION

Today, there exist a real need to overcome the draw backs of the traditional jewelry making precesses. The present invention addresses and solves each of the problems outlined above. The present invention solves these problems by replacing the metal molds with low cost silicone molds used in conjunction with a multipurpose mold frame made of aluminum.

Silicone molds of the type contemplated by the present invention are easily made. They can be made in the multipurpose mold frame directly from the model. Thus, machining and tooling of the mold is eliminated substantially reducing labor costs. One master aluminum mold frame can be used to make many different molds.

Silicone sleeve molds of the present invention have other significant advantages over metal molds. First, they are flexible. This flexibility allows for the reproduction of more intricate and sophisticated designs than cannot realistically be reproduced in metal molds. Second, silicone does not oxidize like metal eliminating the expenses associated with repair, maintenance and replacement of metal molds. Third, the durability of such silicone molds eliminates the need to maintain the original model. If a model is ever needed in the future to create additional molds, it can be easily recreated from the mold. Alternatively, the additional molds can be accurately and efficiently created from either a wax or finished piece. Finally, there is no shrinkage with silicone molds, eliminating many factors of shrinkage and reduction.

Another significant advantage of the present invention is the ease with which photoetched, milled or machined inserts can be coupled to the mold to alter the basic design. As a result, one can incorporate graphics, text, signatures, symbols and the like at very low cost. All this can be done without creating a new model or a new mold.

The use of ultraviolet light to aid in curing the item being molded decreases the process time of the item in the mold and results in a higher quality product. When the mold and frame for the mold transmit ultraviolet light the outside of the item to be molded can be cured with ultraviolet light. When the arbor used also transmits ultraviolet light the inside of the item to be cured can also be cured with ultraviolet light.

A better understanding of the advantages of the present invention can be obtained from a reading of the following detailed description of the invention and the accompanying drawings which form a part of this specification. Of course, this description is not intended to be limiting and the scope of the invention is defined only by the claims.

DETAILED DESCRIPTION OF THE PREFERRED EMBODIMENTS

The present invention provides a method and apparatus for creating a whole host of jewelry items including rings, pendants, bracelets, necklaces, chains and the like. The jewelry products can be very simple or very complex in design. The jewelry products can be made entirely out of metal or can include stones or other ornaments. The jewelry products can also include various graphic elements including signs, symbols, letters, numbers, or signatures. In fact an infinite number of graphic images is available.

Figure 1:
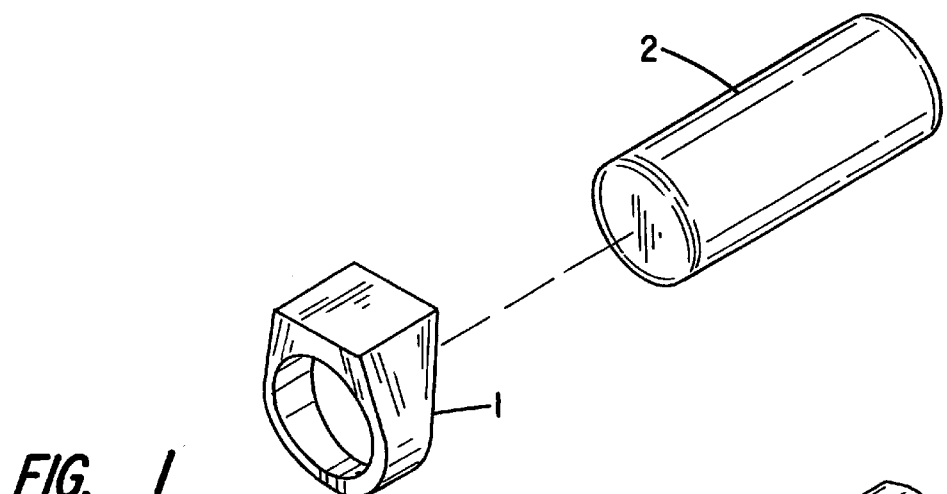
FIG. 1 is a perspective view showing the way a model and arbor are assembled to form the mold.

The present invention involves making a model of the piece to be molded. The model 1 can be formed out of metal, plastic or any other suitable material. When the piece to be produced is a ring, the model is placed over an arbor 2 as depicted in FIG. 1. The model 1 and arbor 2 are then placed within a master frame 3.

The master frame 3 is preferably made out of metal such as an inexpensive, easily tooled aluminum. The master frame shown in FIG. 2 has a first half 4 and a second half 5. Each half 4 and 5 has an outer wall 20, an inner face 22 and a side wall 24. The inner face 22 of half 4 is intended to be placed in face-to-face registration with the inner face 22 of half 5 when the master frame is assembled as shown in FIG. 2.

Figure 4:
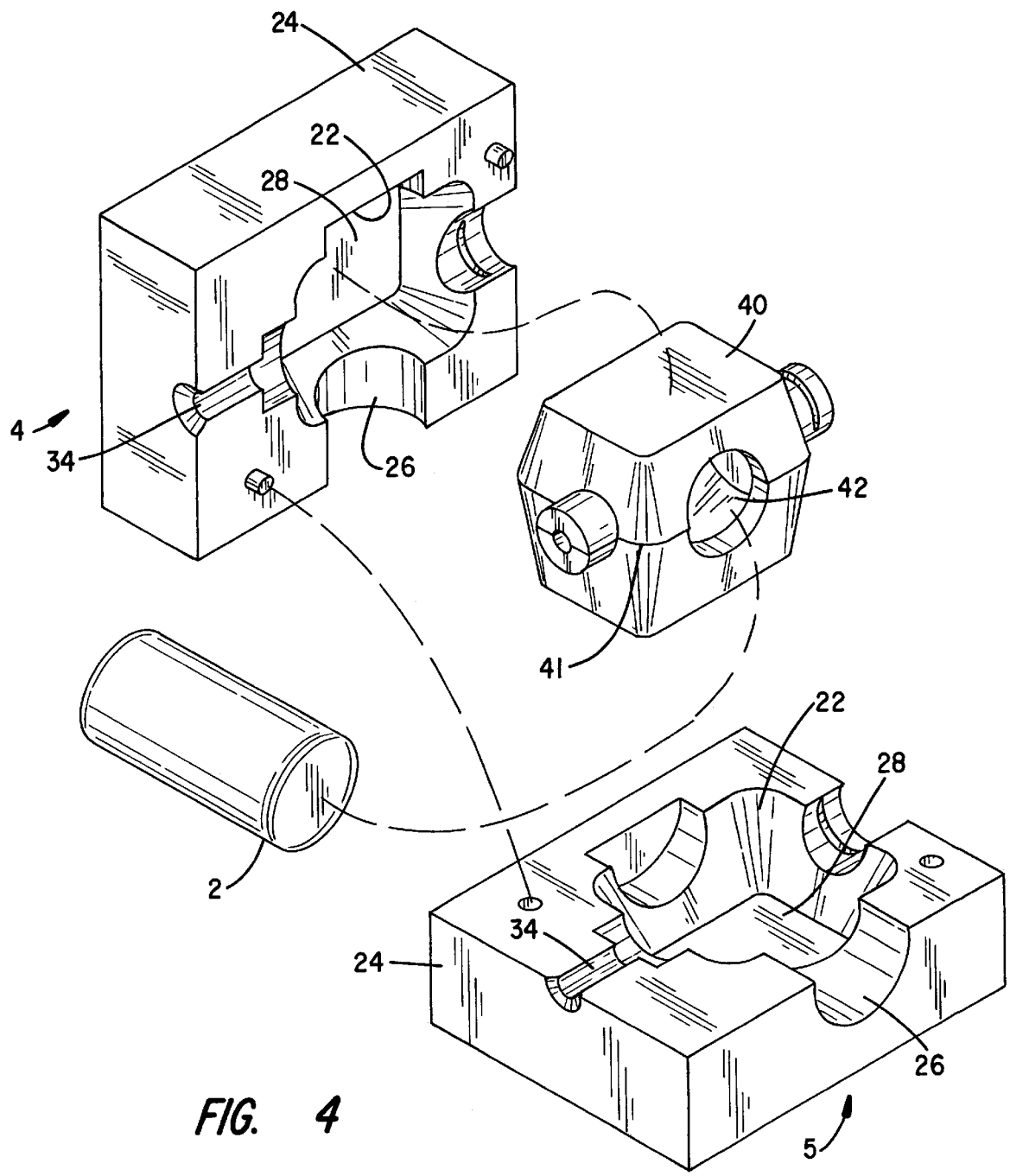
FIG. 4 is an exploded perspective view showing the various components of the present invention.
Figure 5:
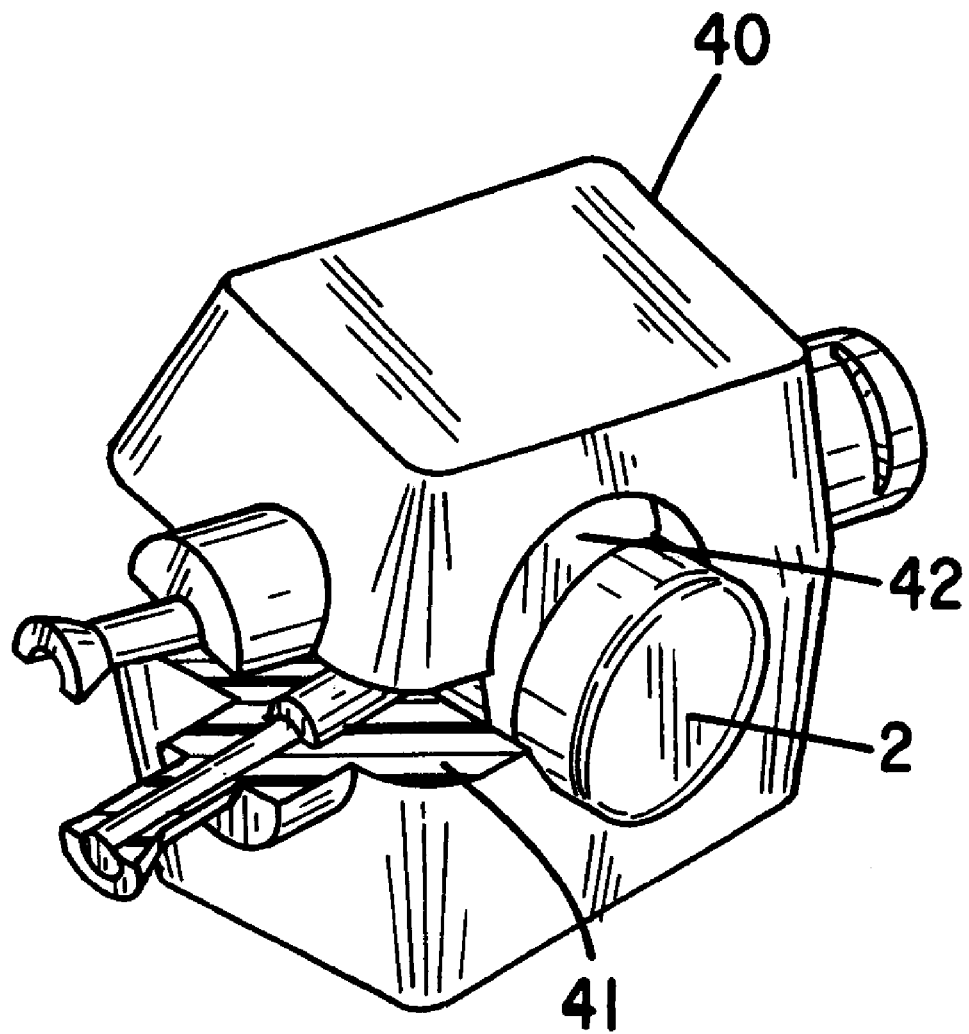
FIG. 5 shows the manner in which the mold can flexibly open to remove a finished piece.

As shown in FIG. 4, the inner face 22 of each half includes a machined-out arbor area 26 for receiving the arbor and a machined-out center mold area 28. Assembly of the two halves results in the creation of an arbor cavity formed by the two arbor areas 26 and a mold cavity formed by the two center mold areas 28. The master frame 3 also includes an injection port 34 extended into the mold cavity between the halves of the silicon molds 40 from the exterior of the master frame.

Figure 2:
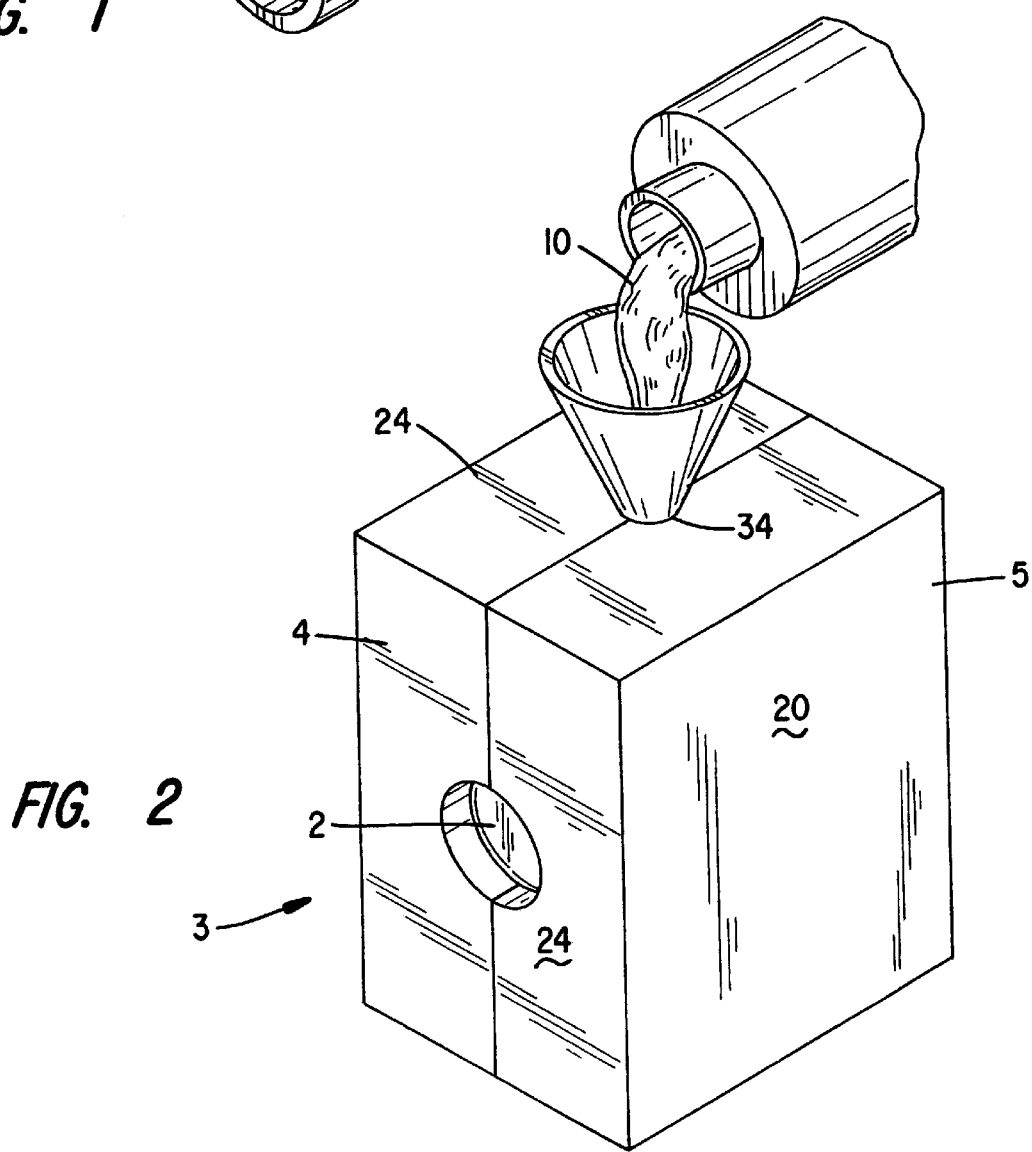
FIG. 2 is a perspective view showing the manner in which material is deposited into a mold frame constructed in accordance with the present invention.
Figure 3:
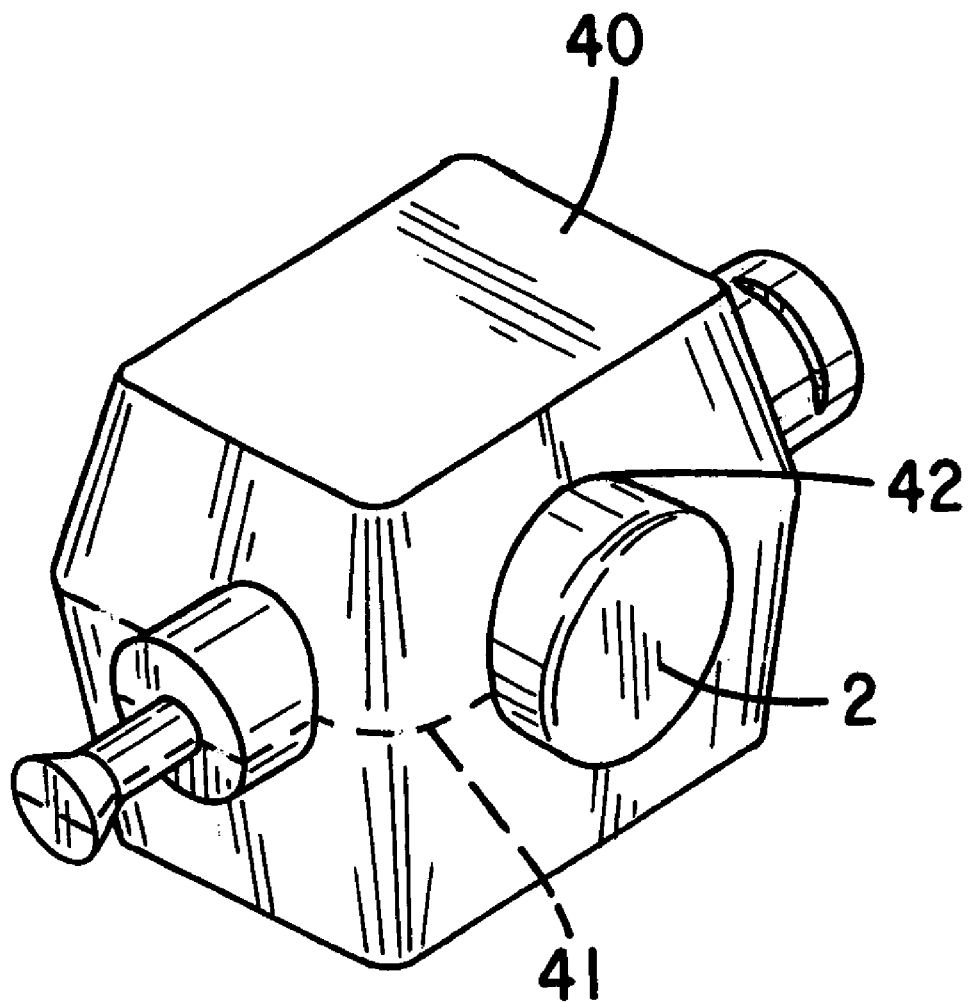
FIG. 3 is a perspective view of a mold formed in accordance with the present invention.

As shown in FIG. 2, with the master frame 3 assembled around the arbor 2 and model 1, silicone 10 is poured through the port 34. The model and portions of the arbor located within the mold cavity are surrounded by the silicon 10, which fills the remainder of cavity. The silicone is then permitted to harden.

After the silicone hardens, the next step is to disassemble the master frame, remove the arbor, model and hardened silicone from the master frame, and cut a parting line 41 in the hardened silicone so that the arbor and model can be removed from the silicone. The result is a silicone mold 40 of the piece. As shown, the silicone mold has a pair of openings 42 through which the arbor 2 can extend.

The silicone mold 40 can be used to create waxes of the piece. As shown in FIG. 4, an arbor 2 of a suitable size is slid through the openings 42 of the silicone mold 40. The arbor 2 and mold 40 are then placed in the master frame 3. The master frame is closed, and wax is injected through the port 34 in the master frame into the silicone mold and allowed to harden. In this fashion, a suitable wax of the model 1 is produced. The wax of the model is removed by opening the master frame 3, splitting the silicone mold 40 along the parting line 41 and sliding the wax off the arbor. Any number of different molds can be made using silicone and the master frame 3 in this manner.

As indicated above, significant advantages are derived from the use of silicone molds 40 to make the waxes as opposed to machined metal molds. Some of these advantages relate to cost savings, others relate to durability and still others relate to the flexibility of the silicone molds 40 permitting more intricate patterns. The use of photo-etched machine inserts becomes practical when used in conjunction with silicone molds. Also, stone setting can be an easier task if the stone is inserted into the silicone mold and transferred either directly to a metal piece or to a metal piece by being transferred to the wax, again transferred to the plaster of paris mold, and finally transferred to the piece itself.

Still another advantage is the variety of materials other than wax that can be molded using the master frame 3 and the silicone mold 40. For example, the silicone mold 40 can be used to mold metal. Also, there are various composites available today that are attractive and durable. Some of these composites set up quickly when exposed to ultraviolet light. When arbor 2 is made of a material capable of transmitting light (such as glass) the arbor 2 can be used as a vehicle for exposing the composite deposited in the silicone mold to ultraviolet light.

Using the silicone molds 40 in combination with inserts opens up a whole range of cost-effective possibilities. Such inserts can be plastic or metal-backed. Such inserts can be photoetched or machined in any of a variety of techniques.

In alternative embodiments the silicone molds 40 may be made of a silicone or other material such Similarly the master frame 3 can be made of a material such as acrylic which can transmit ultraviolet light.

In this manner an item to be molded which is curable by ultraviolet light can be cured from the outside of the item by light penetrating the master frame 3 and the silicone mold 40.

In embodiments where the master frame 3, the silicone mold 40 and the arbor 2 are all made of materials which will transmit ultraviolet light the ultraviolet light can cure the item from the inside and the outside simultaneously.

While the description set forth above has been with reference to the manufacture of rings, those skilled in the art will recognize that the same process can be used in connection with the manufacture of a variety of jewelry products. The process can also be used to mold other non-jewelry products. Thus, this description is not intended to be limited and the inventor seeks to have the scope of the invention to be limited only by the language of the claims.

What is claimed is:

1. For use in the molding of an item, an apparatus including:

a master frame, made of a material capable of transmitting ultra violet light, including an injection port and two halves, each half having an inner face and a mold area so when the two halves are joined together with their inner faces in face-to-face registration a mold cavity is formed by the mold areas of the two halves, and a silicone mold, made of a material capable of transmitting ultra violet light, insertable into the mold cavity of the master frame and supported by the master frame so that material injected through the injection port can flow into said silicone mold to form an item shaped by the silicone mold, and an arbor, wherein said master frame also includes an arbor cavity for receiving said arbor and said silicone mold includes an opening so that the silicone mold can be slipped over said arbor, such that ultraviolet light can penetrate the master frame and the silicone mold to cure the item being molded from the outside of the item being molded.

2. For use in the molding of an item, an apparatus as in claim 1 wherein, the arbor, made of a material capable of transmitting ultra violet light, such that ultraviolet light can penetrate the arbor to cure the item being molded from the inside of the item being molded as well as from the outside.

3. A method for molding an item, said method including the following steps:

providing a master frame, made of a material capable of transmitting ultraviolet light, separable into at least two parts, said master frame including an injection port, a mold cavity, and an arbor cavity;

providing a silicone mold insert, made of a material capable of transmitting ultraviolet light;

providing an arbor;

enclosing said silicone mold and said arbor within the mold cavity of said master frame;

injecting through said injector port and into said mold a material that sets up when exposed to ultraviolet light; and exposing said material to ultraviolet light via said master frame and silicon mold.

4. The method of claim 3 further including the step of attaching at least one stone to said silicone mold insert that will adhere to said material when said material sets up.

5. A method for molding an item, as in claim 3 wherein:

providing an arbor made of a material capable of transmitting ultraviolet light;

exposing said material to ultraviolet light via said master frame silicon mold and arbor.

6. The method of claim 5 further including the step of attaching at least one stone to said silicone mold insert that will adhere to said material when said material sets up.

7. A method for molding an item, said method including the following steps:

providing a master frame separable into at least two parts, said master frame including an injection port, a mold cavity, and an arbor cavity;

providing a silicone mold insert;

providing an arbor made of a material capable of transmitting ultraviolet light;

enclosing said silicone mold and said arbor within the mold cavity of said master frame;

injecting through said injector port and into said mold a material that sets up when exposed to ultraviolet light; and exposing said material to ultraviolet light via said arbor.

8. The method of claim 7 further including the step of attaching at least one stone to said silicone mold insert that will adhere to said material when said material sets up.

* * * * *